United States Patent Office 3,317,265
Patented May 2, 1967

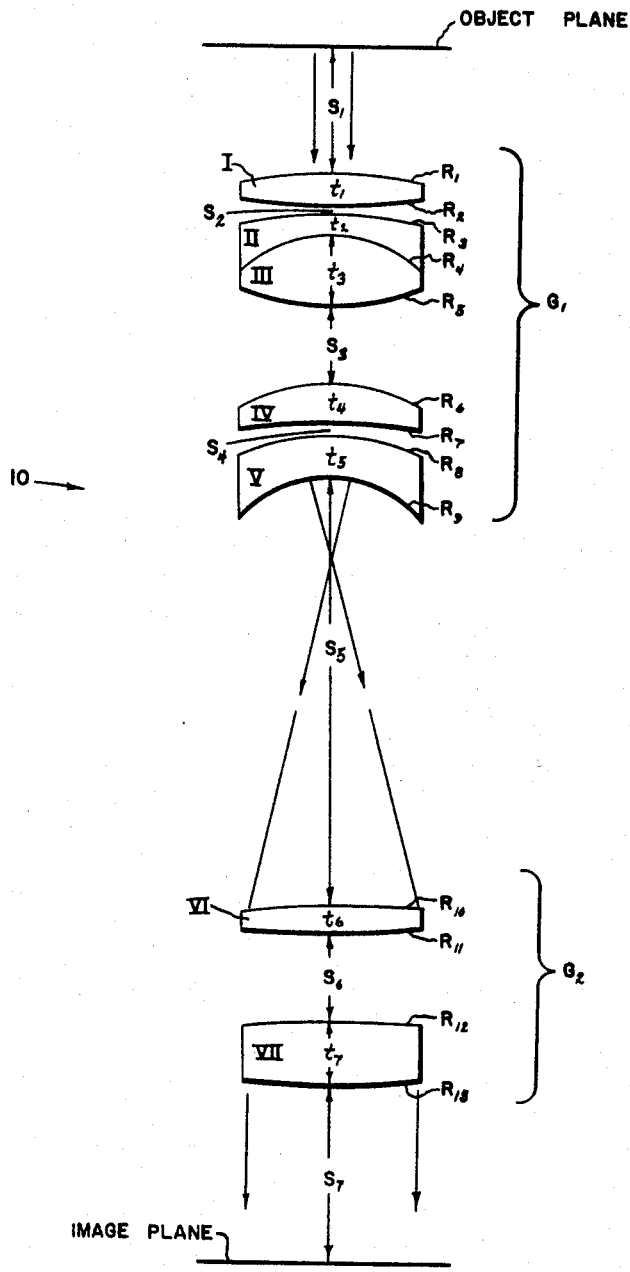

3,317,265
AFOCAL RELAY LENS SYSTEM
Guy V. Coniglio, Rochester, N.Y., assignor to Bausch & Lomb Incorporated, Rochester, N.Y., a corporation of New York
Filed Dec. 19, 1963, Ser. No. 331,779
2 Claims. (Cl. 350—46)

ABSTRACT OF THE DISCLOSURE

A fixed focus afocal relay lens system having a magnification of substantially 5× for use on optical measuring projectors where increased magnification is required.

---

The present invention relates to a relay lens system and more particularly it relates to an image magnifying afocal type of optical system.

Because of the continued development of miniaturization programs in industry, optical instruments are required to work at much higher magnification than heretofore. The necessary increase in magnifying power does not create any sizeable problem in some types of optical systems but it may present a considerable problem in others. A problem is presented, for instance, when it is necessary to provide a booster magnification as an auxiliary device for a contour or measuring projector by reason of the fact that a distortionless image is a prime necessity along with the desired high magnification and along with an excellent state of all chromatic and monochromatic image aberrations.

In view of the above-mentioned considerations, it is an object of the present invention to provide an afocal relay lens system having an image magnification of 5×, said image being free of distortion and furthermore having an excellent correction for coma and astigmatism as well as spherical and chromatic aberrations.

It is a further object to provide such a device which is constructed of simple and low-cost optical parts which are so arranged and constructed to produce an exact specified magnification while achieving a near optimum state of correction.

Other objects and advantages will be apparent from a study of the specification herebelow taken in connection with the accompanying drawing having a single figure which generally illustrates a preferred form of the invention.

The optical system according to this invention is generally designated by the numeral 10 and it is composed of a sequence of optically aligned lenses and lens elements which are numbered from I to VII beginning at the entrant side of said system and which together form an afocal optical system having a magnification of 5× for the image produced thereby. The optical system is characterized by two groups of lenses, the front group being designated $G_1$ and the rear group being designated $G_2$, these two groups being separated by a long axial air space which is the sum of the focal lengths of both groups.

Starting at the object plane, parallel light enters a front double convex positive singlet lens designated I, the air space between the object plane and lens I being designated $S_1$. Closely spaced rearwardly of lens I is a doublet lens of positive power which is composed of a negative meniscus front lens element II and a double convex positive lens element III which lies in contact with lens element II. A small air space between the singlet lens I and said doublet lens is designated $S_2$. Spaced by a distance designated $S_3$ rearwardly of said doublet lens is a pair of meniscus lenses which are located at the rear end of group $G_1$, the meniscus front lens being positive in power and being designated IV and the rear lens being designated V and being of negative power. The air space between the two meniscus lenses is designated $S_4$. For best performance, it has been determined that the values of spaces $S_2$, $S_3$ and $S_4$ should bear the following mathematical relationship to each other substantially.

$$S_3 = 379 \ S_2 = 25.3 \ S_4$$

The air space between the lens groups $G_1$, $G_2$ is designated $S_5$ and rearwardly thereof is provided a second double convex positive singlet lens designated VI which is separated by a space designated $S_6$ from a third double convex singlet lens which is designated VII. Rearwardly of lens VII the image rays are collimated and extend through the air space designated $S_7$ to the image plane. As aforementioned, space $S_5$ is adjusted to obtain a precise magnification of 5× and it is also necessary to coincidentally adjust the air space $S_6$ so as to maintain proper afocality of the optical system when making other adjustments.

The axial thicknesses of the lens elements I to VII are designated respectively from the front of the system as $t_1$ to $t_7$ and the focal length of the front group of lenses $G_1$ is designated by F and serves as a parameter for the measurement of the other constructional properties of the lens system 10. The radii of the successive refractive surfaces of the aforesaid lens elements numbering from the front of the optical system are designated $R_1$ to $R_{13}$.

It is of importance that the form of the lens system as above outlined is so chosen as to not only the adjustable after installation so as to produce an exact magnification of 5× for use in critical measuring in contour projectors but it is also a purpose of this invention to construct the various lens elements in as simple a form as consistent with superior optical performance when used together in the optical system. Therefore, three simple singlet double convex lenses are provided having low curvatures on their refractive surfaces and lens VI being a symmetrical construction for advantages in low-cost manufacture. For the same reason, all of the positive lens elements I, III, VI, VII excluding positive lens element IV have been specified as being made from the same glass. For the proper correction of achromatic and monochromatic image aberrations, the refractive index of the glasses in the aforesaid positive lenses is specified with such a value that it is exceeded by at least .170 by the refractive index value of the negative lens II and is exceeded by at least .092 by the value of refractive index of either of the meniscus lenses IV or V.

With particular reference to the focal lengths of the respective lenses, the values thereof are given in the table of mathematical expressions herebelow in which the focal lengths of the double convex singlet lenses I, VI and VII are designated respectively, $F_I$, $F_{VI}$ and $F_{VII}$, the focal length of the doublet lens is designated $F_d$ and the focal lengths of the two meniscus lenses IV and V are designated respectively $F_{IV}$ and $F_V$.

$$2.08\ F < F_I < 2.54\ F$$
$$1.064\ F < F_d < 1.300\ F$$
$$1.667\ F < F_{IV} < 2.037\ F$$
$$1.903\ F < -F_V < 2.327\ F$$
$$20.09\ F < F_{VI} < 24.55\ F$$
$$5.56\ F < F_{VIII} < 6.80\ F$$

These aforesaid lenses are so adjusted that the focal length of lens group $G_2$ is $5\times$ the focal length of the lens group $G_1$.

The constructional data relating to the lens thicknesses and the air spaces as above mentioned are given in the table of mathematical expressions given herebelow in terms of F which is the focal length of lens group $G_1$.

$$.0561\ F < t_1 < .0685\ F$$
$$.1748\ F < t_d < .2136\ F$$
$$.0851\ F < t_4 < .1041\ F$$
$$.0851\ F < t_5 < 1.041\ F$$
$$.0624\ F < t_6 < .0762\ F$$
$$.1352\ F < t_7 < .1652\ F$$
$$.960\ F < S_1 < 1.174\ F$$
$$.01661\ F < S_2 < .02031\ F$$
$$.630\ F < S_3 < .770\ F$$
$$.0249\ F < S_4 < .0305\ F$$
$$3.982\ F < S_5 < 4.868\ F$$
$$.701\ F < S_6 < .857\ F$$
$$1.397\ F < S_7 < 1.707\ F$$

Stated in another manner, the parameters of the optical system may be specified by the aforesaid radii $R_1$ to $R_{13}$, the values of said radii being specified in the table of mathematical expressions herebelow, the minus (−) sign used with certain values applying to surfaces having their centers of curvature located on the entrant side thereof, $$.579 < \frac{R_1}{-R_2} < .717$$

$$1.35 < \frac{R_3}{-R_5} < 1.65$$

$$.2571 < \frac{R_6}{R_7} < .3143$$

$$1.623 < \frac{R_8}{R_9} < 1.983$$

$$.9 < \frac{R_{10}}{-R_{11}} < 1.1$$

$$7.22 < \frac{R_{12}}{-R_{13}} < 8.82$$

$$3.064 < \frac{R_3}{R_4} < 3.746$$

Furthermore, the values for refractive index $n_D$ and the Abbé number $\nu$ relating to the optical materials from which the successive lenses I to VII are manufactured are given in the table of mathematical expressions herebelow, wherein the refractive index of the lenses I to VII are designated respectively $n_D(I)$ to $n_D(VII)$, Abbé numbers are correspondingly designated $\nu(I)$ to $\nu(VII)$, $$1.512 < n_D(I) < 1.522$$
$$1.684 < n_D(II) < 1.694$$
$$1.512 < n_D(III) < 1.522$$
$$1.607 < n_D(IV) < 1.617$$
$$1.608 < n_D(V) < 1.618$$
$$1.512 < n_D(VI) < 1.522$$
$$1.512 < n_D(VII) < 1.522$$
$$60.0 < \nu(I) < 70.0$$
$$26.0 < \nu(II) < 36.0$$
$$60.0 < \nu(III) < 70.0$$
$$55.0 < \nu(IV) < 65.0$$
$$40.0 < \nu(V) < 50.0$$
$$60.0 < \nu(VI) < 70.0$$
$$60.0 < \nu(VII) < 70.0$$

More specifically, said parameters of the optical system are specified in the table of mathematical expressions given herebelow wherein the designations remain the same as heretofore, $R_1 = 1.955\ F$    $t_2 = .0438\ F$
$-R_2 = 3.044\ F$    $t_3 = .1502\ F$
$R_3 = 1.955\ F$    $t_4 = .0946\ F$
$R_4 = .568\ F$    $t_5 = .0946\ F$
$-R_5 = 1.303\ F$    $t_6 = .0693\ F$
$R_6 = .824\ F$    $t_7 = .1502\ F$
$R_7 = 2.88\ F$    $S_1 = 1.067\ F$
$R_8 = .954\ F$    $S_2 = .01846\ F$
$R_9 = .529\ F$    $S_3 = .7000\ F$
$R_{10} = 23.09\ F$    $S_4 = .0277\ F$
$-R_{11} = 23.09\ F$    $S_5 = 4.425\ F$
$R_{12} = 28.8\ F$    $S_6 = .779\ F$
$-R_{13} = 3.593\ F$    $S_7 = 1.552\ F$
$n_D(I) = 1.517$    $\nu(I) = 64.5$
$n_D(II) = 1.689$    $\nu(II) = 30.9$
$n_D(III) = 1.517$    $\nu(III) = 64.5$
$n_D(IV) = 1.612$    $\nu(IV) = 59.5$
$n_D(V) = 1.613$    $\nu(V) = 44.2$
$n_D(VI) = 1.517$    $\nu(VI) = 64.5$
$n_D(VII) = 1.517$    $\nu(VII) = 64.5$
$t_1 = .0623\ F$ One successful form of this invention is specified numerically in the chart given herebelow, wherein the designations for the parameters remain the same as heretofore, Magnification=5×  Afocal Lens System

| Lens | Radii | Thicknesses | Spaces | $n_D$ | $\nu$ |
|---|---|---|---|---|---|
| I | $R_1 = 84.723$<br>$-R_2 = 131.830$ | $t_1 = 2.70$ | $S_1 = 46.25$<br><br>$S_2 = 0.08$ | 1.517 | 64.5 |
| II | $R_3 = 84.723$<br>$R_4 = 24.860$ | $t_2 = 1.90$ | | 1.689 | 30.9 |
| III | $-R_5 = 56.494$ | $t_3 = 6.50$ | $S_3 = 30.30$ | 1.517 | 64.5 |
| IV | $R_6 = 35.645$<br>$R_7 = 124.740$ | $t_4 = 4.10$ | $S_4 = 1.20$ | 1.612 | 59.5 |
| V | $R_8 = 41.305$<br>$R_9 = 22.909$ | $t_5 = 4.10$ | $S_5 = 191.45$ | 1.613 | 44.2 |
| VI | $R_{10} = 1000.0$<br>$-R_{11} = 1000.0$ | $t_6 = 3.00$ | $S_6 = 33.75$ | 1.517 | 64.5 |
| VII | $R_{12} = 1247.4$<br>$-R_{13} = 159.60$ | $t_7 = 6.50$ | $S_7 = 67.18$ | 1.517 | 64.5 |

All scalar values given in millimeters.

It will be seen that there is here provided an afocal relay optical system which is capable of superior optical performance at a specified precise image magnification in conformity with the objects of this invention and although only a preferred embodiment of this invention has been shown and described in detail, other forms are possible and changes may be made in the detailed structure of each part thereof within the specified limitations expressed hereabove without departing from the spirit of the invention as set forth in the claims here appended.

I claim:

1. An afocal relay lens system for forming an image of 5.0× magnification of an object, said system being especially well corrected for distortion, field curvature, spherical and chromatic aberration, coma and astigmatism, said system comprising a succession of optically aligned lenses which are a front singlet lens designated I which is spaced rearwardly in the direction of entrant light from an object plane by an axial distance which is designated $S_1$ and has an axial thickness designated $t_1$, a doublet lens which is spaced rearwardly of lens I at a distance designated $S_2$ and is composed of a front negative lens element designated II and of a rear positive lens element designated III and in contact therewith, the axial thicknesses thereof being designated respectively $t_2$ and $t_3$, a singlet positive meniscus lens designated IV which is spaced from lens III by a distance $S_3$ and has an axial thickness designated $t_4$, a singlet negative meniscus lens designated V which is spaced from lens IV by a distance $S_4$ and has an axial thickness designated $t_5$, a positive singlet lens designated VI which is spaced from lens V by an axial distance $S_5$ and has an axial thickness represented by $t_6$, a rearmost positive singlet lens designated VII which is spaced an axial distance $S_6$ from lens VI and has an axial thickness designated $t_7$, the axial space rearwardly of lens VII to the image being designated $S_7$, the optical parameters governing the construction of said system being set forth in the table of mathematical expressions herebelow in which $R_1$ to $R_{13}$ represent the successive radii of the refractive surfaces of the lenses I to VII, the minus (−) sign used therewith applying to those surfaces having a center of curvature on the entrant side of said surfaces, and F designates the focal length of the group of lenses I to V, the refractive index $n_D$ of the optical materials in the successive lenses I to VII being designated $n_D(I)$ to $n_D(VII)$ and the Abbé number $\nu$ of said optical materials being designated $\nu(I)$ to $\nu(VII)$, the absolute values of the refractive indices and Abbé numbers being given in the table of mathematical expressions herebelow, $R_1 = 1.955F$
$-R_2 = 3.044F$
$R_3 = 1.595F$
$R_4 = .568F$
$-R_5 = 1.303F$
$R_6 = .824F$
$R_7 = 2.88F$
$R_8 = .954F$
$R_9 = .529F$
$R_{10} = 23.09F$
$-R_{11} = 23.09F$
$R_{12} = 28.8F$
$-R_{13} = 3.593F$
$n_D(I) = 1.517$
$n_D(II) = 1.689$
$n_D(III) = 1.517$
$n_D(IV) = 1.612$
$n_D(V) = 1.613$
$n_D(VI) = 1.517$
$n_D(VII) = 1.517$
$t_1 = .0623F$ $t_2 = .0438F$
$t_3 = .1502F$
$t_4 = .0946F$
$t_5 = .0946F$
$t_6 = .0693F$
$t_7 = .1502F$
$S_1 = 1.067F$
$S_2 = .01846F$
$S_3 = .7000F$
$S_4 = .0277F$
$S_5 = 4.425F$
$S_6 = .779F$
$S_7 = 1.552F$
$\nu(I) = 64.5$
$\nu(II) = 30.9$
$\nu(III) = 64.5$
$\nu(IV) = 59.5$
$\nu(V) = 44.2$
$\nu(VI) = 64.5$
$\nu(VII) = 64.5$ 2. An afocal relay lens system having a distortionless image magnification of 5× along with an excellent correction for all chromatic and monochromatic aberrations, said system comprising in optical alignment a front double convex singlet lens designated I and spaced at an axial distance which is designated $S_1$ from an object plane, a doublet lens spaced at a distance $S_2$ rearwardly of lens I, said lens being composed of a negative meniscus lens element designated II and composed of a double convex lens element designated II, a positive meniscus lens designated IV and spaced at a distance $S_3$ from said doublet lens and at a distance $S_4$ from a negative meniscus lens designated V and located rearwardly thereof, said lenses being convex toward entrant light, a second double convex singlet lens designated VI and spaced at a distance $S_5$ rearwardly of lens V, and a third double convex singlet lens designated VII which is spaced at a distance $S_6$ from lens VI, the lens VII being spaced at a distance $S_7$ from the image formed by said system, the constructional data for said optical system being specified in the chart herebelow wherein the radii of the successive lenses I to VII numbered in order from the front of the system being designated $R_1$ to $R_{13}$ and the minus (−) sign used therewith applying to those lens surfaces having their centers of curvature on the entrant side thereof, the axial thicknesses of the successive lenses I to VII being designated $t_1$ to $t_7$, the refractive index and the Abbé number of the optical materials in said lenses being designated respectively $n_D$ and $\nu$.

Magnification=5× Afocal Lens System

| Lens | Radii | Thicknesses | Spaces | $n_D$ | $\nu$ |
|---|---|---|---|---|---|
| | | | $S_1 = 46.25$ | | |
| I | $R_1 = 84.723$ | $t_1 = 2.70$ | | 1.517 | 64.5 |
| | $-R_2 = 131.830$ | | | | |
| | | | $S_2 = 0.08$ | | |
| II | $R_3 = 84.723$ | $t_2 = 1.90$ | | 1.689 | 30.9 |
| | $R_4 = 24.860$ | | | | |
| III | $-R_5 = 56.494$ | $t_3 = 6.50$ | | 1.517 | 64.5 |
| | | | $S_3 = 30.30$ | | |
| IV | $R_6 = 35.645$ | $t_4 = 4.10$ | | 1.612 | 59.5 |
| | $R_7 = 124.740$ | | | | |
| | | | $S_4 = 1.20$ | | |
| V | $R_8 = 41.305$ | $t_5 = 4.10$ | | 1.613 | 44.2 |
| | $R_9 = 22.909$ | | | | |
| | | | $S_5 = 191.45$ | | |

Magnification=5X    Afocal Lens System

| Lens | Radii | Thicknesses | Spaces | $n_E$ | $\nu$ |
|---|---|---|---|---|---|
| VI | $R_{10}=1000.0$<br>$-R_{11}=1000.0$ | $t_6=3.00$ | | 1.517 | 64.5 |
| | | | $S_6=33.75$ | | |
| VII | $R_{12}=1247.4$<br>$-R_{13}=159.60$ | $t_7=6.50$ | | 1.517 | 64.5 |
| | | | $S_7=67.18$ | | |

All scalar values given in millimeters.

No references cited.

JEWELL H. PEDERSEN, *Primary Examiner.*
JOHN K. CORBIN, *Examiner.*